United States Patent [19]

Kaneda et al.

[11] 4,178,431

[45] Dec. 11, 1979

[54] AROMATIC COPOLYAMIDE FIBER FROM BENZIDINE SULFONE OR DIAMINO PHENANTHRIDONE

[75] Inventors: Takaho Kaneda, Chiba; Seiji Ishikawa, Ichihara; Hiroshi Daimon, Ichihara; Toshio Katsura, Ichihara; Tatsuaki Maeda, Ichihara; Tadahiro Hondo, Chiba, all of Japan

[73] Assignee: Ube Industries, Ltd., Yamaguchi, Japan

[21] Appl. No.: 799,091

[22] Filed: May 20, 1977

[30] Foreign Application Priority Data

May 28, 1976 [JP] Japan .................................. 51/61234
Feb. 8, 1977 [JP] Japan .................................. 52/12066

[51] Int. Cl.$^2$ ............................................. C08G 69/32
[52] U.S. Cl. ................................ 528/337; 260/30.8 R;
264/176 F; 525/410; 528/336; 528/339;
528/341; 528/344
[58] Field of Search ............. 260/78 R; 528/337, 339,
528/341, 344

[56] References Cited

U.S. PATENT DOCUMENTS

| | | | |
|---|---|---|---|
| 3,006,899 | 10/1961 | Hill et al. | 528/349 |
| 3,240,760 | 3/1966 | Preston et al. | 260/78 R |
| 3,354,125 | 11/1967 | Smith et al. | 260/78 R |
| 3,376,268 | 4/1968 | Preston | 260/78 R |
| 3,467,623 | 9/1969 | Hinderer et al. | 260/78 R |

*Primary Examiner*—Harold D. Anderson
*Attorney, Agent, or Firm*—Sherman and Shalloway

[57] ABSTRACT

Fibers of a copolyamide derived from a diamine component including 10 to 50 mole % of benzidine sulfone or 2,7-diaminophenanthridone and 90 to 50 mole % of p-phenylene diamine and a dicarboxylic acid component derived from a reactive derivative of terephthalic acid are disclosed. The fibers have an initial modulus of elasticity of at least 400 g/d and a tensile strength of at least 16 g/d.

The fibers have in combination various desirable properties, such as excellent initial modulus of elasticity, high tensile strength, high knot strength, high heat resistance and good adhesiveness to various plastics, rubbers and adhesives, and they are valuably used in various industrial fields as fibrous reinforcers and for production of fiber-reinforced plastics and rubber products.

8 Claims, 1 Drawing Figure

U.S. Patent     Dec. 11, 1979     4,178,431
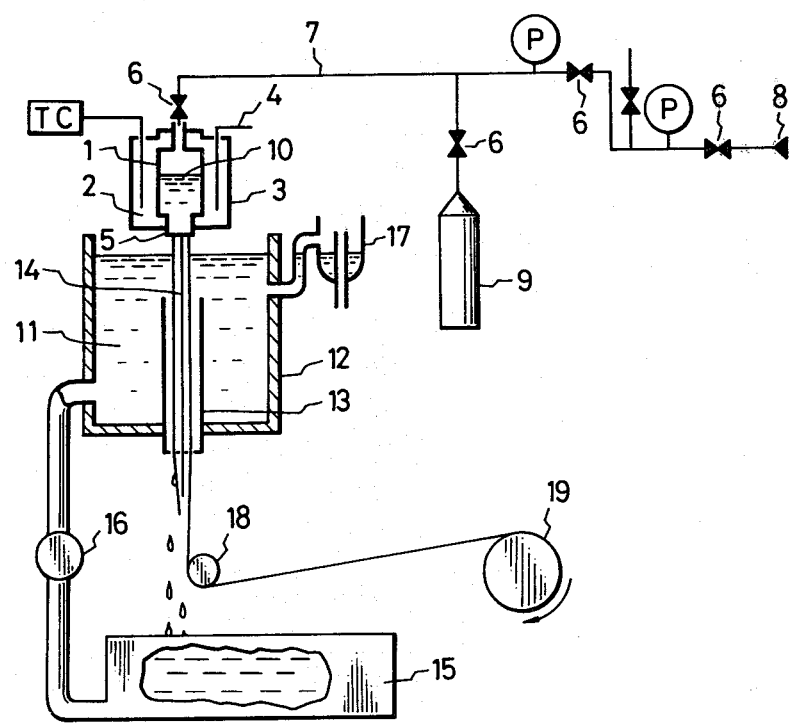

AROMATIC COPOLYAMIDE FIBER FROM BENZIDINE SULFONE OR DIAMINO PHENANTHRIDONE

This invention relates to fibers composed of a novel copolyamide and having a high initial modulus of elasticity and a high strength, and a process for the production of these fibers.

Novel fibers of this invention are composed of a high-molecular-weight copolyamide consisting essentially of units (A) represented by the following formula:

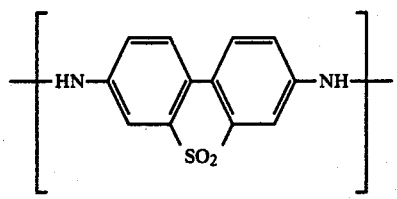

(A-1)

or

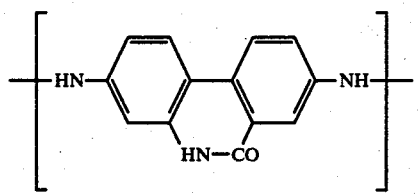

(A-2)

units (B) represented by the following formula:

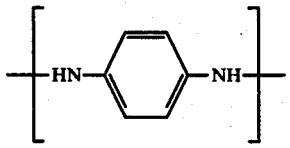

(B)

and units (C) represented by the following formula:

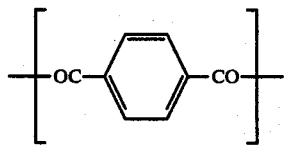

(C)

in which the units (A), (B) and (C) are present in such amounts that the sum of amounts of units (A) and (B) is substantially equimolar to the amount of the units (C) and the molar ratio of the units (A) to the units (B) is in the range of from 10/90 to 50/50, and the novel fibers have an initial modulus of elasticity of at least 400 g/d and a tensile strength of at least 16 g/d.

The above novel copolyamide is prepared by reacting a diamine component consisting essentially of (a) benzidine sulfone or 2,7-diaminophenanthridone and (b) p-phenylene diamine with (c) a reactive derivative of terephthalic acid in an organic solvent (solution copolycondensation) while adjusting the amounts of the reactants (a), (b) and (c) so that the units (A) derived from benzidine sulfone or 2,7-diaminophenanthridone and the units (B) derived from p-phenylene diamine are introduced in the resulting copolyamide at the above-mentioned molar ratio and the sum of the amounts of the units (A) and (B) is substantially equimolar to the amount of the units (C) derived from terephthalic acid.

Benzidine sulfone used as the diamine component in the synthesis of the novel copolyamide is a known compound, and it can be prepared, for example, by a method comprising reacting biphenyl with sulfur in the presence of anhydrous aluminum chloride to form dibenzothiophene, oxidizing dibenzothiophene with hydrogen peroxide to form dibenzothiophene-5,5'-dioxide, nitrating the dioxide with concentrated nitric acid to form 3,7-dinitrodibenzothiophene-5,5'-dioxide and reducing the so formed dioxide with stannous chloride in the state acidified by hydrochloric acid to form benzidine sulfone.

2,7-Diaminophenanthridone used as the diamine component in the synthesis of the novel copolyamide is a known compound, and it can be synthesized, for example, from fluorenone through a series of the steps of nitration, reduction and Schmitz reaction.

As the reactive derivative of terephthalic acid, there may be employed reactive derivatives of terephthalic acid customarily used for polyamide-forming reactions, such as terephthaloyl halides.

The reaction (solution copolycondensation) between the above-mentioned diamine component and terephthalic acid component is preferably conducted in an organic solvent. As such organic solvents, there can be mentioned, for example, amides such as N,N-dimethyl acetamide, N,N-dimethyl propionamide, hexamethyl phosphoramide, N,N,N',N'-tetramethyl urea and N-methyl caprolactam, and pyrrolidones such as N-methyl-2-pyrrolidone, 1,5-dimethyl-2-pyrrolidone and N-acetyl-2-pyrrolidone. These organic solvents may be used singly or in the form of a mixed solvent of two or more of them. Moreover, mixed solvents of the foregoing solvents with dimethyl sulfoxide, tetrahydrofuran, trimethylchlorosilane, triethylchlorosilane, dimethyldichlorosilane and the like may be used. The foregoing basic nitrogen-containing compounds such as dimethyl acetamide and N-methyl-2-pyrrolidone act not only as excellent reaction media but also as acid binders capturing hydrogen halides formed as the by-product at the copolycondensation between the diamines and terephthaloyl halide and thereby promoting the copolycondensation.

A dissolving assistant such as lithium chloride, calcium chloride or the like may be incorporated in the organic solvent.

In order to prepare a copolyamide having a high molecular weight, it is preferred that as illustrated in Examples given hereinafter, purified reactants and solvents be used so that the amounts of impurities and water present in the reaction mixture are made as small as possible, and the copolycondensation be carried out in an inert atmosphere free of water, for example, in a dried nitrogen current.

In the initial stage of the copolycondensation, it is preferred that the reaction be carried out at a temperature as low as possible, for example, at a temperature lower than 50° C. In general, the copolycondensation is accomplished by maintaining a solution of the above-mentioned diamines in a suitable organic solvent under cooling and adding the above-mentioned reactive derivative of terephthalic acid to this solution. The foregoing two diamines may be reacted with the reactive derivative of terephthalic acid simultaneously or separately in sequence.

The copolycondensation may be conducted in a continuous manner or batchwise.

The copolyamide that is used in the present invention must have a fiber-forming molecular weight. In the present invention, the copolyamide has an inherent viscosity $\eta inh$ of at least 2.0 dl/g, preferably at least 3.0 dl/g, as measured at a temperature of 30° C. in a solution in 95 to 98% sulfuric acid containing 0.5 g/dl of the polymer. The inherent viscosity $\eta inh$ referred to herein is a measured value defined by the following formula:

$$\eta inh = ln\ (\eta rel)/C$$

wherein C is a concentration of the polymer solution (g of the polymer per 100 ml of the solvent) and $\eta rel$ stands for a relative viscosity, namely the ratio of the flow times of the polymer solution and solvent as measured by a capillary viscometer.

Fibers of this invention are prepared by spinning a spinning solution containing the above-mentioned high-molecular-weight copolyamide dissolved in a solvent in a filamentary form and solidifying the spun copolyamide in the filamentary form.

As the solvent for formation of the spinning solution, concentrated sulfuric acid or fuming sulfuric acid is used.

The copolyamide separated and purified in the above-mentioned copolycondensation method is soluble in concentrated sulfuric acid or fuming sulfuric acid at a relatively low temperature and provides a spinning solution having a concentration suitable for spinning, for example, a spinning solution having a copolyamide content of 15 to 25%, preferably 18 to 23%. The concentration of sulfuric acid used for formation of the spinning solution must be at least 98%, and the amount of water present in the spinning solution, which causes degradation of the copolyamide, is made as small as possible. Dissolution of the copolyamide is conducted at a relatively low temperature ranging from room temperature to 110° C., whereby degradation of the copolyamide at the dissolving step is conveniently prevented. When the copolyamide is dissolved in the solvent, at least one member selected from hydrogen fluoride, hydrogen chloride, fluorosulfuric acid, chlorosulfuric acid, antimony pentafluoride, antimony trifluoride, boron trifluoride and phosphorus pentafluoride may be added as a dissolving assistant.

A technique according to the customary wet spinning method can be adopted for production of fibers. More specifically, the above-mentioned spinning solution is directly spun in a coagulating medium or it is once spun into a non-coagulating medium such as air and is then introduced into a coagulating medium, whereby solidification is effected and fibers are obtained.

At the step of spinning the spinning solution, the spinning solution is maintained at an optional temperature in the range of from a lowest temperature at which the solution has a flowability enough for handling to about 110° C. The amount of the degraded copolyamide depends on the spinning time and temperature. Accordingly, the spinning solution is preferably spun at a temperature of about 70° to about 90° C. Water is preferably used as the coagulating medium. In addition, there may be employed monohydric and polyhydric alcohols such as methyl alcohol, ethylene glycol, glycerin and isopropanol, mixtures of water with such alcohols, and aqueous solutions of acids such as sulfuric acid, alkalis such as ammonium hydroxide, and salts such as calcium chloride. At the wet spinning step, the temperature of the coagulating medium is not particularly critical, but in general, it is preferred that the temperature of the coagulating medium be in the range of from $-10°$ C. to from $+80°$ C.

According to one preferred embodiment of the present invention, the spinning solution of the copolyamide is spun in a non-coagulating atmosphere and the spun filament streams are solidified in a coagulating medium to form fibers. In this case, it is preferred to adopt a so-called flow-down stretch spinning method in which the coagulating medium is flown down in the spinning direction and a tension is given to the filament streams by friction caused between the coagulating medium and the filament streams. In this flow-down stretch spinning method, a simple cylinder or a cylinder in which the sectional area is gradually reduced in the spinning direction by expanding the upper portion like a funnel or diminishing the diameter in the lower portion may be used as a stretch spinning cylinder for contacting the spun filament streams with the coagulating medium. Further, a stretch spinning cylinder having a plurality of holes formed through the side wall may be used. As the non-coagulating medium, gases such as air and nitrogen, and inert liquids immiscible with the spinning solution, such as hydrocarbon liquids, can be used. Coagulating media as recited hereinbefore can be similarly employed.

Spun fibers may be subjected to various post treatments such as washing, neutralization, finishing and drying before or after winding on bobbins or hanks. Water and a mixture of water with a water-miscible organic solvent can be used for washing, and the solvent or salts left in the fibers can be removed by this washing treatment. When an acid such as hydrochloric acid or sulfuric acid tends to be left in the fibers, a dilute aqueous solution of an alkali is sprayed to the copolyamide fibers or the copolyamide fibers are dipped in this aqueous solution, whereby undesirable adverse effects by the acid can be conveniently prevented. The so neutralized copolyamide fibers are subjected to the final water washing or finishing water washing, and then, they are dehydrated according to need. After the water washing, the copolyamide fibers are dried on a heating roll or in an air heating bath to obtain a product. It is preferred that the above-mentioned post treatments such as rinsing, neutralization, finishing and drying be conducted prior to winding of the spun copolyamide fibers by introducing them into treatment zones such as rinsing zones or baths. However, it is possible to wind copolyamide fibers on bobbins or hanks after spinning or some post treatments, feed wound copolyamide fibers to post treatment zones and perform all or remaining post treatments.

In general, the copolyamide fibers of the present invention in the as-spun state have an initial modulus of elasticity of at least 400 g/d and a tensile strength of at least 16 g/d. However, is desired, these copolyamide fibers may be subjected to the heating treatment under tension. For example, they may be treated at a temperature of 200° to 600° C. under a tension of up to 5 g/d. This heat treatment under tension may be accomplished by a known drawing apparatus including a hot plate or pin or using a heated fluid.

Known additives such as antioxidants, heat stabilizers, ultraviolet absorbers, dyes, fillers, flame retardants and delusterants may be incorporated into the copolyamide fibers of the present invention according to known recipes.

The fibers of the present invention have in combination various desirable properties, such as excellent initial modulus of elasticity, high tensile strength, high knot strength, high heat resistance and good adhesiveness to various plastics, rubbers and adhesives, and they are valuably used in various industrial fields, for example, as tire cords and reinforcers for rubbery products such as tire belts and hoses, fibrous reinforcers for various fiber-reinforced plastics and as industrial fibers for production of ropes, filter cloths and various covers.

The present invention will now be described in detail by reference to the following Referential Examples and Examples that by no means limit the scope of the invention.

In these Examples, spinning of fibers from the spinning solution was conducted according to the flow-down stretch spinning method and apparatus illustrated hereinafter.

The accompanying drawing, is an arrangement chart illustrating diagrammatically the spinning apparatus used in the Examples.

Referring now to the FIGURE around a spinning cylinder 1 formed of a stainless steel of SUS 32, a jacket 3 is disposed to maintain the temperature of the spinning cylinder at a certain level by a heating medium 2. In the heating medium 2, there are disposed a sheathed wire heater 4 for heating the heating medium 2 and a temperature control mechanism TC for detecting and recording the temperature of the heating medium and controlling the temperature by adjusting the electrical input to the sheathed wire heater 4. Two stainless steel nets (not shown) having a mesh size of 625 mesh and a spinneret 5 having a thickness of 0.3 mm and 3 or 5 holes 0.08 mm in diameter are attached to the lower portion of the spinning cylinder 1. The upper portion of the spinning cylinder 1 is communicated with a nitrogen bomb 8 and a nitrogen gas reservoir 9 through a series of valves 6 and conduits 7, so that a predetermined pressure is applied to a spinning solution 10 in the spinning cylinder 1. A pressure gauge P is disposed in each conduit for measuring this pressure.

A spinning water tank 12 for containing therein water 11 (spinning water) as the coagulating medium is disposed below the spinneret 5, and a stretch spinning cylinder 13 (hereinafter referred to as "spinning water cylinder") having the upper end opened to the interior of the spinning water tank 12 and the lower end opened below the spinning water tank 12 is disposed in the spinning water tank 12. The axial line of this spinning water cylinder is in agreement with the spinning direction of the spinneret 5. Filament streams 14 spun from the spinneret 5 are introduced into the spinning water cylinder 13 and a tension is given thereto by contact with water flowing down in the interior of the spinning water cylinder 13.

A water tank 15 is disposed to collect water flowing down from the spinning water cylinder 13, and water collected in the tank 15 is recycled to the spinning water tank 12. The liquid level in the spinning water tank 12, namely the thickness of a non-coagulating medium layer present between the spinneret 5 and the liquid level, is adjusted by a liquid level adjusting mechanism 17. The fibers to which a tension has been given in the spinning water cylinder 13 are wound on a bobbin 19 through a winding guide 18.

In the Examples, physical properties of fibers were determined according to the following method.

More specifically, the tensile strength (g/d), elongation (%), initial modulus of elasticity (g/d) and knot strength (g/d) were determined according to the method of JIS L-1069 by stretching monofilaments having a length of 25 mm at a stretching rate of 10 mm/min by using a tensile tester manufactured by Shinko Tsushin Kogyo Kabushiki Kaisha. Each value was an average value calculated from results of the tests made on ten different monofilaments.

Referential Example 1

The process for the synthesis of benzidine sulfone will now be described.

(A) Synthesis of Dibenzothiophene

Dibenzothiophene was synthesized according to the method taught by Henry Gilman et al [J. Org. Chem., 3, 108–119 (1938)].

More specifically, a 5-liter capacity round-bottomed flask equipped with a reflux cooler was charged with 500 g of biphenyl and 208 g of sulfur, and the flask was dipped in an oil bath maintained at a temperature of 115° to 120° C. and 25 g of anhydrous aluminum chloride was added little by little over a period of 75 minutes to the charge of the flask. The reaction mixture became dark green and it was bubbled to generate hydrogen sulfide gas. When 3 hours had passed from the start of addition of anhydrous aluminum chloride, the bath temperature was gradually elevated to 240° C. over a period of 9 hours. Then, the flask was naturally cooled and 500 cc of water was added to the charge of the flask and boiled under agitation to extract $AlCl_3$. The water layer was removed by decantation and the residue was boil-washed with 500 cc of water again. When the temperature was lowered under boiling and agitation, the organic layer was converted to a greyish brown granular solid. The solid was dried, and 1 l of ethanol was added and boiled, and filtration was conducted while the temperature was still high. Cooling of the filtrate gave a white crystal. This extraction was repeated 8 times, and recovered crystals were collected. The so obtained crude crystalline product was subjected to distillation under reduced pressure to collect a fraction distilled at 152° to 154° C. under 3 mm Hg. The intended product was obtained in an amount of 354 g (the yield being 60%), and it was found to have a melting point of 99° to 101° C.

(B) Synthesis of Dibenzothiophene-5,5′- dioxide

Dibenzothiophene-5,5′-dioxide was synthesized according to the method taught by Henry Gilman et al [J. Am. Chem. Soc., 67, 1479–1480 (1945)].

In 200 cc of glacial acetic acid was dissolved 38.6 g of dibenzothiophene at 80° C. and 60 cc of 30% $H_2O_2$ was added to the solution. The temperature was elevated to 90° C. and this temperature was maintained for 1 hour. Then, the temperature was further elevated and the reaction mixture was refluxed for 30 minutes. Then, 10 cc of 30% $H_2O_2$ was added to the reaction mixture, and the mixture was further refluxed for 30 minutes and was then cooled. Precipitated crystals were recovered by filtration and washed with water to obtain 41.7 g of the intended compound (the yield being 96%). The obtained compound was found to have a melting point of 233° to 234° C.

(C) Synthesis of 3,7-Dinitrodibenzothiophene-5,5'-dioxide 3,7-Dinitrodibenzothiophene-5,5'-dioxide was synthesized by nitrating dibenzothiophene-5,5'-dioxide according to the method taught by N. M. Cullinane et al [J. Chem. Soc., 1936, 1435–1437].

In 105 cc of concentrated sulfuric acid was dissolved 30 g of dibenzothiophene-5,5'-dioxide, and 90 cc of nitric acid having a specific gravity of 1.5 was added dropwise to the solution, whereby the temperature of the liquid was elevated to 60° to 70° C. After completion of the dropwise addition, the reaction mixture was heated on a boiling water bath for 40 minutes, and the reaction mixture was then cooled and poured into ice water. Precipitated white crystals were recovered and recrystallized from acetone to obtain 25 g (the yield being 67%) of the intended compound in the form of a light yellow crystal melting at 290° C.

(D) Synthesis of Benzidine Sulfone

Benzidine sulfone was prepared by reducing 3,7-dinitrodibenzothiophene-5,5'-dioxide according to the method taught by R. K. Brown et al [J. Am. Chem. Soc., 74, 1165–1167 (1952)].

To 80 ml of glacial acetic acid was added 5 g of 3,7-dinitrodibenzothiophene-5,5'-dioxide, and the mixture was agitated. Then, a solution containing 60 cc of concentrated HCl and 40 g of $SnCl_2.H_2O$ was added to the above mixture, and the resulting mixture was agitated at room temperature for 2 hours and heated on a boiling water bath for 1 hour. The reaction mixture was cooled and the precipitated hydrochloride was recovered by filtration. The recovered crystal was dispersed in water and neutralized with NaOH, and the precipitated diamine was recovered by filtration. Recrystallization from alcohol gave 3 g of the intended product (the yield being 75%) having a melting point of 327° to 328° C.

Referential Example 2

The process for the synthesis of 2,7-diaminophenanthridone (hereinafter referred to as "DAP") will now be described.

(1) Synthesis of 2,7-Dinitrofluorenone

An egg plant type flask having an inner capacity of 1 l and equipped with a reflux cooler was charged with 20.1 g of fluorenone, and 500 g of fuming nitric acid having a specific gravity of 1.52 was added dropwise to the charge of the flask under cooling on an ice bath to effect reaction.

The ice bath was exchanged with an oil bath, and the reaction mixture was heated and refluxed under agitation for about 2 hours. The reaction mixture was naturally cooled and poured into water in an amount about 4000 times the amount of the reaction mixture, to obtain a yellow precipitate of 2,7-dinitrofluorenone. The amount of the so obtained crude product was 28.9 g (the yield being 96%).

The so obtained crude product was recrystallized from 2020 ml of acetic acid to obtain 16.3 g of purified 2,7-dinitrofluorenone having a melting point of 292° to 294° C.

(2) Synthesis of 2,7-Dinitrophenanthridone

A four-neck separable flask having an inner capacity of 1 l and equipped with a thermometer, a reflux cooler, a dropping funnel and an agitator was charged with 51.3 g of purified 2,7-dinitrofluorenone and 500 ml of concentrated sulfuric acid to dissolve 2,7-dinitrofluorenone in concentrated sulfuric acid. Under cooling on an ice bath, a solution of 24.7 g of sodium azide in 70 ml of water was gradually added dropwise to the above solution over a period of 6 hours. During the dropwise addition, the reaction temperature was maintained at 7° to 8° C. After completion of the dropwise addition, 500 ml of water was further added dropwise to the reaction mixture while maintaining the temperature at 10° C. The resulting liquid reaction mixture containing a yellow precipitate was gradually poured into aqueous ammonia containing floating ice to neutralize sulfuric acid in the reaction mixture. The precipitate was recovered by filtration, washed with water, dried and dissolved under heating into 1200 ml of nitrobenzene. Filtration was conducted while the mixture was still hot, and the insoluble matter was removed. The filtrate was naturally cooled and a precipitated brown crystal of 2,7-dinitrophenanthridone was recovered by filtration, washed with benzene and dried. The amount of so obtained 2,7-dinitrophenanthridone was 50.3 g (the yield being 93%).

(3) Synthesis of DAP

A stainless steel autoclave having an inner capacity of 5 l and equipped with an agitator was charged with 110 g of 2,7-dinitrophenanthridone, 2.5 l of N,N'-dimethyl acetamide (DMAC) and 10 g of a Pd-on-carbon catalyst (N type manufactured by Kawaken Fine Chemical; Pd content=5%), and air was purged from the autoclave. Reaction was conducted at 90° C. under a hydrogen pressure of 40 $Kg/cm^2$ (gauge) for 4 hours.

The catalyst was separated from the reaction mixture by filtration, and the filtrate was subjected to reduced pressure distillation to recover DMAC completely. The residual brown solid was incorporated and dissolved in dilute hydrochloric acid formed by adding 70 ml of concentrated hydrochloric acid to 18 l of water, and the resulting solution was mixed with 5 g of active carbon and allowed to stand still for 2 hours. The solution was then filtered, and the filtrate was neutralized with a 1 N aqueous solution of NaOH and the precipitated light yellowish green crystal was recovered by filtration, washed with water and dried to obtain 85 g of a crude product of DAP.

The so obtained crude product of DAP was purified by sublimation in the following manner.

First, 10 g of the crude product of DAP was placed on the bottom of a cylindrical flask having a diameter of 75 mm and a length of 300 mm, and while air was removed from the flask by a vacuum pump, only the bottom portion of the flask was heated to 270° to 280° C. by an electric muffle furnace, and purified DAP adhering on the inner wall of the upper portion of the flask by sublimation was then scraped. The above purification procedures were repeated and 76.5 g of purified DAP (the yield being 90%) was obtained as a whole.

EXAMPLE 1

Preparation of a copolyamide containing 30 mole % of the units (A-1) in the diamine component will now be described.

Starting compounds used other than benzidine sulfone were purified in the following manners.

(i) Purification of Terephthaloyl Chloride

Commercially available terephthaloyl chloride (manufactured by Tokyo Kasei) was distilled under a reduced pressure of 8 mm Hg at 125° C. by using a Vigoureux distillation head.

(ii) Purification of p-Phenylene Diamine

Commercially available p-phenylene diamine (manufactured by Yoneyama Yakuhin) was distilled under a reduced pressure of 30 mm Hg at 180° C. by using a Vigoureaux distillation head.

(iii) Purification of N-Methyl Pyrrolidone (NMP) and Hexamethyl Phosphoramide (HMPA)

Each of these solvents was purified by separating 15% of the initial fraction by distillation using a Widmer distillation column, collecting the medium fraction and throwing calcium hydride to the medium fraction to effect dehydration.

A 4-neck separable flask having a capacity of 2 liters and equipped with an agitator, a nitrogen-introducing opening, a calcium chloride pipe and a starting compound throwing opening was sufficiently dried and 236 ml of HMPA, 472 ml of NMP, 15.03 g of p-phenylene diamine and 14.67 g of benzidine sulfone were charged in the flask. The mixture was agitated in a nitrogen gas atmosphere at 80° C. to form a solution. Then, 40.31 g of terephthaloyl chloride was added from the starting compound throwing opening to the solution under ice cooling while continuing agitation, and agitation was continued even after completion of the addition of terephthaloyl chloride.

With advance of the reaction, the liquid reaction mixture became viscous, and when the reaction was conducted for 30 minutes, the reaction mixture was powdered and came to have a form resembling bread crumbs. When the reaction was conducted for 2 hours, the ice cooling bath was taken out and the reaction product mixture was poured in a large quantity of water and the resulting copolyamide was washed under pulverization by means of a household mixer. The copolyamide was collected by filtration, dipped in methanol overnight, collected by filtration and then dried.

The amount of the so obtained copolyamide was 55.5 g (the yield being 100%) and the inherent viscosity ($\eta$inh) was 7.38 dl/g.

The decomposition temperature of the copolyamide was 474° C. In the instant specification, by the term "decomposition temperature" is meant a temperature causing 2% weight loss when 10 mg of a sample is taken and the temperature is elevated at a rate of 5° C. per minute while keeping the sample in air. The measurement of the decomposition temperature was conducted in this Example and subsequent Examples by using a standard type of Differential Thermobalance TG-DSC (manufactured by Rigaku Denki Kabushiki Kaisha). The so determined decomposition temperature will be referred to as "Td" hereinafter.

Preparation of fibers from the so prepared copolyamide will now be described.

The so obtained copolyamide containing 30 mole % of the units (A-1) in the diamine component was dissolved in 99.3% sulfuric acid at 85° C. to form a spinning solution (dope) having a concentration of 20% by weight, and the spinning solution was spun downwardly in the vertical direction through a spinneret having 3 holes 0.08 mm in diameter, passed through an air layer having a length of about 10 mm, introduced into water maintained at about 0° C., passed through a water spinning cylinder formed of a glass pipe (6 mm in diameter and 15 cm in length) in which water was flown down, and wound on a bobbin at a predetermined speed.

Experimental conditions adopted at the above stretch spinning were as follows:

Dope temperature: 85° C.
Extrusion pressure: 50 Kg/cm$^2$
Extrusion speed: 30 m/min
Spinning water speed: 70 m/min
Winding speed: 153 m/min
Spin stretch factor: 5.2

The filaments wound on the bobbin were washed in the wound state with distilled water containing a small amount of sodium bicarbonate and with distilled water, and dried at room temperature. Properties of the dried filaments are as follows:

Fineness: 3.1 denier
Tensile strength: 21.1 g/d
Elongation: 5.2%
Initial modulus of elasticity: 411 g/d
Knot strength: 8.2 g/d The filaments were heat-treated by running them through a quartz pipe in a nitrogen gas atmosphere, which was placed in a tubular electric furnace having a length of 30 cm, under conditions indicated in Table 1. Properties of obtained fibers are shown in Table 1.

Table 1

| Heat Treatment Conditions | | | | Properties of Fibers | | | |
|---|---|---|---|---|---|---|---|
| Temperature (°C.) | Tension (g/d) | Time (sec) | Fineness (denier) | Tensile Strength (g/d) | Elongation (%) | Initial Modulus of Elasticity (g/d) | Knot Strength (g/d) |
| 350 | 1.1 | 6.9 | 2.6 | 23.9 | 3.2 | 716 | 5.6 |
| 400 | 1.1 | 6.9 | 2.7 | 28.0 | 3.5 | 732 | 5.8 |
| 450 | 1.1 | 6.9 | 2.6 | 31.1 | 3.5 | 805 | 4.7 |
| 500 | 1.1 | 6.9 | 2.6 | 28.1 | 3.3 | 759 | 4.5 |
| 400 | 1.4 | 6.9 | 2.6 | 31.9 | 3.8 | 757 | 4.7 |
| 400 | 0.7 | 6.9 | 2.8 | 29.9 | 3.8 | 690 | 4.5 |

EXAMPLE 2

The reaction was carried out in the same manner as in Example 1 except that 226 ml of HMPA, 451 ml of NMP, 17.11 g of p-phenylene diamine, 9.74 g of benzidine sulfone and 40.16 g of terephthaloyl chloride were used, to obtain a light yellow copolyamide containing 20 mole % of the units (A-1) in the diamine component. The amount of the copolyamide obtained was 52.3 g (the yield being 99.4%) and the copolyamide was characterized by an inherent viscosity ($\eta$inh) of 6.06 dl/g and a decomposition temperature (Td) of 489° C.

Spun filaments were prepared from the so obtained copolyamide in the same manner as described in Example 1 except that the copolymer concentration in the spinning dope was changed to 22% by weight and the extrusion speed was changed to 33 m/min (accordingly, the spin stretch factor was changed to 4.7).

The dried filaments had the following properties:
Fineness: 3.65 denier
Tensile strength: 26.1 g/d
Elongation: 4.89%
Initial modulus of elasticity: 525 g/d
Knot strength: 7.5 g/d The filaments were heat-treated in the same manner as described in Example 1 except that the treatment atmosphere was changed to an argon atmosphere. The heat treatment conditions and properties of the resulting fibers are shown in Table 2.

Table 2

| Heat Treatment Conditions | | | | Properties of Fibers | | | |
| --- | --- | --- | --- | --- | --- | --- | --- |
| Temperature (°C.) | Tension (g/d) | Time (sec) | Fineness (denier) | Tensile Strength (g/d) | Elongation (%) | Initial Modulus of Elasticity (g/d) | Knot Strength (g/d) |
| 450 | 1.4 | 6.9 | 3.4 | 37.5* | 3.9 | 971 | 6.1 |
| 500 | 1.7 | 6.9 | 3.5 | 35.0** | 3.3 | 998 | 5.7 |
| 500 | 2.2 | 6.9 | 3.6 | 36.8 | 3.7 | 946 | 4.7 |
| 500 | 2.7 | 6.9 | 3.5 | 33.9 | 3.2 | 1011 | 4.5 |

*The maximum tensile strength was 43.2 g/d among 10 sample filaments.
**The maximum tensile strength was 44.1 g/d among 10 sample filaments.

EXAMPLE 3

The reaction was carried out in the same manner as in Example 1 except that 218 ml of HMPA, 436 ml of NMP, 19.36 g of p-phenylene diamine, 4.90 g of benzidine sulfone and 40.38 g of terephthaloyl chloride were used, to obtain a light yellow copolyamide containing 10 mole % of the units (A-1) in the diamine component. The amount of the copolyamide obtained was 49.7 g (the yield being 99.1%), and the copolyamide was characterized by an inherent viscosity (ηinh) of 4.95 dl/g and a decomposition temperature (Td) of 491° C.

Spun filaments were prepared from the so obtained copolyamide in the same manner as in Example 1 under the following conditions:
Dope temperature: 85° C.
Extrusion pressure: 40 Kg/cm²
Extrusion speed: 50 m/min
Spinning water speed: 70 m/min
Winding speed: 153 m/min
Spin stretch factor: 3.1

The dried spun filaments had the following properties:
Fineness: 5.3 denier
Tensile strength: 22.2 g/d
Elongation: 5.2%
Initial modulus of elasticity: 481 g/d
Knot strength: 6.5 g/d The spun filaments were heat-treated in the same manner as described in Example 1. The heat treatment conditions and properties of the obtained fibers are shown in Table 3.

Table 3

| Heat Treatment Conditions | | | | Properties of Fibers | | | |
| --- | --- | --- | --- | --- | --- | --- | --- |
| Temperature (°C.) | Tension (g/d) | Time (sec) | Fineness (denier) | Tensile Strength (g/d) | Elongation (%) | Initial Modulus of Elasticity (g/d) | Knot Strength (g/d) |
| 300 | 0.8 | 6.9 | 4.6 | 22.9 | 3.2 | 714 | 4.9 |
| 350 | 1.2 | 1.6 | 4.6 | 22.3 | 2.9 | 755 | 5.0 |
| 400 | 0.8 | 6.9 | 4.5 | 25.2 | 2.8 | 848 | 5.2 |
| 450 | 0.8 | 6.9 | 4.5 | 27.0 | 2.8 | 923 | 4.9 |
| 500 | 0.8 | 6.9 | 4.2 | 29.7 | 2.8 | 1018 | 4.5 |

EXAMPLE 4

A light yellow copolyamide containing 45 mole % of the units (A-1) in the diamine component was prepared by conducting the polycondensation in the same manner as described in Example 1 except that 243 ml of HMPA, 486 ml of NMP, 11.72 g of benzidine sulfone and 40.01 g of terephthaloyl chloride were used. The amount of the obtained copolyamide was 58.9 g (the yield being 98.9%) and the inherent viscosity (ηinh) of the copolyamide was 7.56 dl/g.

In the same manner as described in Example 1, spun filaments were prepared from this copolyamide under the following conditions:
Dope temperature: 85° C.
Extrusion pressure: 55 Kg/cm²
Extrusion speed: 29 m/min
Spinning water speed: 70 m/min
Winding speed: 118 m/min
Spin stretch factor: 4.1

The dried spun filaments had the following properties:
Fineness: 3.93 denier
Tensile strength: 18.1 g/d
Elongation: 5.7%
Initial modulus of elasticity: 405 g/d
Knot strength: 8.2 g/d The spun filaments were heat-treated in the same manner as described in Example 1. The heat treatment conditions and physical properties of obtained fibers are shown in Table 4.

Table 4

| Heat Treatment Conditions | | | | Properties of Fibers | | | |
|---|---|---|---|---|---|---|---|
| Temperature (°C.) | Tension (g/d) | Time (sec) | Fineness (denier) | Tensile Strength (g/d) | Elongation (%) | Initial Modulus of Elasticity (g/d) | Knot Strength (g/d) |
| 350 | 1.2 | 6.9 | 3.8 | 20.4 | 3.4 | 543 | 7.1 |
| 400 | 1.2 | 6.9 | 3.9 | 22.6 | 3.4 | 597 | 6.8 |
| 450 | 1.2 | 6.9 | 3.7 | 26.1 | 3.6 | 659 | 6.3 |
| 500 | 1.2 | 6.9 | 3.4 | 26.3 | 3.4 | 713 | 7.5 |

EXAMPLE 5

A 4-neck separable flask equipped with an agitator, a nitrogen-introducing opening, a calcium chloride pipe and a starting compound throwing opening was sufficiently dried in advance, and 640 ml of N,N-dimethyl acetamide purified in the same manner as described above with respect to NMP, 640 ml of NMP, 13.50 g of p-phenylene diamine, 7.66 g of benzidine sulfone and 21.0 g of sufficiently dried lithium chloride were charged in the flask and were agitated at room temperature in a nitrogen gas atmosphere to form a solution. Then, 31.70 g of terephthaloyl chloride was charged through the starting compound throwing opening under ice cooling and agitation, and the agitation of the reaction mixture was continued.

Then, the subsequent treatments were carried out in the same manner as described in Example 1 to obtain 41.4 g (the yield being 100%) of a copolyamide having an inherent viscosity ($\eta$inh) of 6.45.

Spun filaments were prepared from the so obtained copolyamide in the same manner as described in Example 1 except that the extrusion pressure, extrusion speed, winding speed and spin stretch factor were changed to 45 Kg/cm$^2$, 33 m/min, 190 m/min and 6.0, respectively. The dried filaments had the following properties.
Fineness: 2.8 denier
Tensile strength: 25.3 g/d
Elongation: 5.6%
Initial modulus of elasticity: 490 g/d
Knot strength: 6.0 g/d The filaments were heat-treated at 400° C. under a tension of 1.4 g/d for 6.9 seconds in the same manner as described in Example 1, to obtain fibers having the following properties:
Fineness: 2.7 denier
Tensile strength: 31.1 g/d
Elongation: 3.9%
Initial modulus of elasticity: 770 g/d
Knot strength: 4.8 g/d

EXAMPLE 6

Preparation of fibers of a copolyamide containing 30 mole % of the units (A-2) in the diamine component will now be described.

Starting materials used were purified in the same manner as described in Example 1.

A 4-neck separable flask having an inner capacity of 2 l and equipped with an agitator, a nitrogen-introducing opening, a calcium chloride pipe and a starting compound throwing opening was sufficiently dried in advance, and 202 ml of HMPA, 404 ml of NMP, 13.081 g of p-phenylene diamine and 11.678 g of DAP were charged in the flask and the mixture was agitated at 80° C. in a nitrogen gas atmosphere to form a solution. Then, 35.084 g of terephthaloyl chloride was added to the solution from the sample-throwing opening under ice cooling and agitation.

With advance of the reaction, the liquid reaction mixture gradually became viscous, and when 30 minutes had passed from the start of the reaction, the reaction mixture was powdered and became crumby. When the reaction had been conducted for 1 hour, the ice bath was taken out and agitation was continued for another 1 hour, and the resulting yellow copolyamide was washed with water and dried.

The amount of the formed copolyamide was 47.0 g (the yield being 100%), and the copolyamide was characterized by an inherent viscosity ($\eta$inh) of 5.90 and a decomposition temperature (Td) of 483° C.

The copolyamide was dissolved in 99% sulfuric acid at 90° C. to form a spinning solution (dope) having a concentration of 20% by weight, and the spinning solution was extruded in the vertical direction from a spinneret having 3 holes having a diameter of 0.08 mm, passed through an air layer having a thickness of about 10 mm, introduced into water maintained at 0° C., passed through a spinning cylinder formed of a glass pipe (having an inner diameter of 6 mm and a length of 15 cm) where spinning water was flowing down and wound at a certain speed on a bobbin.

The experimental conditions adopted were as follows:
Dope temperature: 85° C.
Extrusion pressure: 35 Kg/cm$^2$
Extrusion speed: 31.5 m/min
Spinning water speed: 70 m/min
Winding speed: 153 m/min
Spin stretch factor: 4.9

The spun filaments in the state wound on the bobbin were washed with distilled water containing a small amount of sodium bicarbonate and with distilled water, and dried at room temperature. Properties of the dried filaments were as follows:
Fineness: 3.6 denier
Tensile strength: 23.3 g/d
Elongation: 4.7%
Initial modulus of elasticity: 530 g/d
Knot strength: 7.4 g/d The filaments were heat-treated for 10 seconds by running them through a quartz tube of a nitrogen gas atmosphere having a length of 30 cm and placed in a tubular electric furnace at a speed of 3 cm/sec under a tension described in Table 5. Obtained results are shown in Table 5.

Table 5

| | | Properties of Fibers | | | |
|---|---|---|---|---|---|
| Tension (g/d) | Fineness (denier) | Tensile Strength (g/d) | Elongation (%) | Initial Modulus of Elasticity (g/d) | Knot Strength (g/d) |
| 1.2 | 3.5 | 30.8 | 3.5 | 812 | 7.0 |
| 1.7 | 3.5 | 30.7 | 3.3 | 848 | 6.6 |

Table 5-continued

| | | Properties of Fibers | | | |
|---|---|---|---|---|---|
| Tension (g/d) | Fineness (denier) | Tensile Strength (g/d) | Elongation (%) | Initial Modulus of Elasticity (g/d) | Knot Strength (g/d) |
| 2.4 | 3.5 | 30.6 | 2.8 | 1035 | 6.0 |

EXAMPLE 7

Spinning was carried out in the same manner as in Example 6 except that the winding speed was changed to 118 m/min. The obtained filaments were washed and dried to obtain filaments having the following properties:
Fineness: 4.4 denier
Tensile strength: 21.2 g/d
Elongation: 4.6%
Initial modulus of elasticity: 569 g/d
Knot strength: 7.1 g/d The filaments were heat-treated in the same electric furnace as used in Example 6 in the same manner as described in Example 6 except that the heat treatment conditions were changed as indicated in Table 6. Properties of the obtained fibers are shown in Table 6.

Table 6

| Heat Treatment Conditions | | | Properties of Fibers | | | |
|---|---|---|---|---|---|---|
| Temperature (°C.) | Tension (g/d) | Fineness (denier) | Tensile Strength (g/d) | Elongation (%) | Initial Modulus of Elasticity (g/d) | Knot Strength (g/d) |
| 250 | 1.5 | 4.2 | 26.8 | 3.4 | 748 | 7.7 |
| 350 | 1.5 | 4.2 | 25.9 | 2.8 | 844 | 7.0 |
| 400 | 1.5 | 4.3 | 27.3 | 3.0 | 860 | 6.6 |
| 450 | 1.5 | 3.9 | 33.2 | 3.0 | 1052 | 5.9 |

EXAMPLE 8

Preparation of fibers of a copolyamide containing 10 mole % of the units (A-2) in the diamine component will now be described.

A light yellow copolyamide was prepared in the same manner as described in Example 6 by using 188 ml of HMPA, 376 ml of NMP, 16.846 g of p-phenylene diamine, 3.899 g of DAP and 35.141 g of terephthaloyl chloride.

The amount of the formed copolyamide was 42.8 g (the yield being 99%), and the copolyamide was characterized by an inherent viscosity ($\eta$inh) of 5.08 and a decomposition temperature (Td) of 499° C.

Spinning was carried out in the same manner as described in Example 6 except that the extrusion pressure, extrusion speed, spinning water speed, winding speed and spin stretch factor were changed to 25 Kg/cm$^2$, 27.3 m/min, 70 m/min, 118 m/min and 4.3, respectively. The resulting filaments were washed and dried to obtain filaments having the following properties:
Fineness: 3.8 denier
Tensile strength: 23.3 g/d
Elongation: 5.2%
Initial modulus of elasticity: 480 g/d
Knot strength: 7.0 g/d In the same electric furnace as used in Example 6, the filaments were heat-treated in the same manner as described in Example 6 under conditions indicated in Table 7. Obtained fibers had properties shown in Table 7.

Table 7

| Heat Treatment Conditions | | Properties of Fibers | | | Initial Modulus of Elasticity (g/d) | Knot Strength (g/d) |
|---|---|---|---|---|---|---|
| Temperature (°C.) | Tension (g/d) | Fineness (denier) | Tensile Strength (g/d) | Elongation (%) | | |
| 300 | 1.1 | 4.1 | 24.6 | 3.8 | 675 | 6.0 |
| 350 | 1.1 | 4.1 | 27.1 | 3.4 | 728 | 6.1 |
| 400 | 1.1 | 3.9 | 28.2 | 3.2 | 796 | 4.3 |
| 450 | 1.1 | 3.6 | 32.2 | 3.3 | 858 | 4.5 |
| 500 | 1.1 | 3.8 | 32.3 | 3.1 | 934 | 3.6 |
| 550 | 1.1 | 3.4 | 30.6 | 3.2 | 879 | 3.5 |
| 500 | 1.8 | 3.6 | 33.6* | 3.1 | 980 | 3.9 |
| 500 | 1.2 | 4.1 | 33.5 | 3.4 | 919 | 3.6 |
| 550 | 1.2 | 4.0 | 27.8 | 2.8 | 897 | 3.3 |
| 500 | 2.1 | 4.1 | 29.0 | 2.8 | 937 | 4.1 |
| 500 | 2.2 | 4.0 | 31.0 | 2.9 | 971 | 4.6 |
| 500 | 3.3 | 3.9 | 28.8 | 2.6 | 1052 | 3.2 |
| 450 | 1.7 | 4.1 | 28.2 | 3.0 | 840 | 4.8 |
| 450 | 2.8 | 4.0 | 26.2 | 2.6 | 907 | 4.0 |

Note
*The maximum tensile strength was 36.6 g/d among 10 sample filaments.

EXAMPLE 9

Preparation of fibers of a copolyamide containing 50 mole % of the units (A-2) in the diamine component will now be described.

A 4-neck separable flask having an inner capacity of 500 ml and being similar to the flask used in the preceding Examples was charged with 70 ml of HMPA, 140 ml of NMP, 2.656 g of p-phenylene diamine and 5.533 g of DAP, and the mixture was agitated at 80° C. in a nitrogen atmosphere to form a solution. Then, the flask was placed on an ice bath and 6.94 g of trimethylchlorosilane was added to the solution under cooling. After cooling was conducted for 30 minutes, 9.974 g of terephthaloyl chloride was added to the reaction mixture.

The liquid reaction mixture became promptly viscous to form a mass, and it was then powdered and became crumby. Agitation was conducted for about 2.5 hours under ice cooling, and the resulting yellow copolyamide was thrown into a large quantity of water, thus washed with water and dried to obtain 14.5 g (the yield being 100%) of a copolyamide characterized by an inherent viscosity ($\eta$inh) of 7.53 and a decomposition temperature (Td) of 472° C.

Filaments were prepared from this copolyamide by using a spinneret having 5 holes having a diameter of 0.08 mm in the same manner as described in Example 6 except that the extrusion pressure, extrusion speed, winding speed and spin stretch factor were changed to 52 Kg/cm², 23.9 m/min, 118 m/min and 4.93, respectively. The spun filaments were washed and dried in the same manner as described in Example 6.

The dried filaments had the following properties:
Fineness: 3.3 denier
Tensile strength: 17.9 g/d
Elongation: 4.2%
Initial modulus of elasticity: 514 g/d
Knot strength: 6.5 g/d By using the same electric furnace as described in Example 6, the filaments were heat-treated under conditions indicated in Table 8 to obtain fibers having properties shown in Table 8.

Table 8

| Heat Treatment Conditions | | | Properties of Fibers | | | | |
|---|---|---|---|---|---|---|---|
| Temperature (°C.) | Tension (g/d) | Time (sec) | Fineness (denier) | Tensile Strength (g/d) | Elongation (%) | Initial Modulus of Elasticity (g/d) | Knot Strength (g/d) |
| 300 | 0.9 | 6.9 | 2.9 | 28.2 | 3.1 | 902 | 6.0 |
| 350 | 0.7 | 6.9 | 2.9 | 29.5 | 3.3 | 837 | 6.6 |
| 400 | 1.0 | 6.9 | 3.0 | 28.5 | 2.9 | 925 | 5.9 |
| 450 | 1.0 | 6.9 | 3.0 | 32.6 | 2.9 | 1078 | 5.5 |
| 500 | 1.0 | 6.9 | 3.1 | 30.5 | 2.7 | 1085 | 5.1 |

EXAMPLE 10

Preparation of fibers of a copolyamide containing 30 mole % of the units (A-2) in the diamine component will now be described.

N,N-Dimethyl acetamide (DMA) used was purified in the same manner as described hereinbefore with respect to NMP.

A 4-neck flask equipped with an agitator, a nitrogen-introducing opening, a calcium chloride pipe and a starting compound throwing opening was sufficiently dried in advance and was charged with 660 ml of DMA, 660 ml of NMP, 12.06 g of p-phenylene diamine and 10.75 g of DAP. The mixture was agitated at room temperature in a nitrogen gas atmosphere to form a solution. Then, 25.6 g of sufficiently dried lithium chloride was added to the solution and the mixture was agitated under ice cooling. When about 1 hour had passed, 32.38 g of terephthaloyl chloride was added to the mixture through the starting compound throwing opening and agitation was continued. The liquid reaction mixture gradually became viscous and a rubbery crumby polymer was precipitated. After the reaction had been conducted for 2 hours, a yellow copolyamide was recovered, washed with water, washed with acetone and dried to obtain 43.4 g (the yield being 100%) of a copolyamide having an inherent viscosity (ηinh) of 6.08.

Spun filaments were prepared from this copolyamide in the same manner as described in Example 6 except that the extrusion pressure, extrusion speed, winding speed and spin stretch factor were changed to 50 Kg/cm², 32.0 m/min, 190 m/min and 6.0, respectively. The spun filaments were washed and dried in the same manner as described in Example 6.

Properties of the resulting filaments were as follows:
Fineness: 2.3 denier
Tensile strength: 25.2 g/d
Elongation: 5.4%
Initial modulus of elasticity: 470 g/d
Knot strength: 7.5 g/d The filaments were heat-treted in an electric furnace at a temperature of 450° C. under a tension of 1.1 g/d for 6.9 seconds in the same manner as described in Example 6 to obtain fibers having the following properties:
Fineness: 2.2 denier
Tensile strength: 31.1 g/d
Elongation: 3.5%
Initial modulus of elasticity: 800 g/d
Knot strength: 6.0 g/d

EXAMPLE 11

Preparation of fibers of a copolyamide containing 20 mole % of the units (A-2) in the diamine component will now be described.

The copolycondensation was conducted in the same manner as described in Example 10 by using 530 ml of N,N-dimethyl acetamide, 530 ml of NMP, 11.44 g of p-phenylene diamine, 5.93 g of DAP, 19.7 g of lithium chloride and 26.86 g of terephthaloyl chloride, to obtain 34.6 (the yield being 100%) of a copolyamide having an inherent viscosity (ηinh) of 6.18 and a decomposition temperature (Td) of 485° C. The copolyamide was dissolved in 99.6% sulfuric acid at 85° C. to form a spinning solution (dope) having a concentration of 20% by weight. The spinning solution was extruded in the vertical direction through a spinneret having 5 holes having a diameter of 0.08 mm, passed through an air layer having a thickness of about 10 mm, introduced into water maintained at 0° C., passed through a spinning cylinder formed of a glass tube (having an inner diameter of 6 mm and a length of 15 cm) where spinning water was flowing down, and wound on a bobbin at a certain speed. The experimental conditions adopted were as follows:
Dope temperature: 85° C.
Extrusion pressure: 35 Kg/cm²
Extrusion speed: 35.9 m/min
Spinning water speed: 70 m/min
Winding speed: 150 m/min
Spin stretch factor: 4.8

The spun filaments in the state wound on the bobbin were washed with distilled water containing a small amount of sodium bicarbonate and with distilled water, and dried at room temperature. The dried filaments had the following properties:
Fineness: 3.4 denier
Tensile strength: 25.5 g/d
Elongation: 4.4%
Initial modulus of elasticity: 648 g/d
Knot strength: 6.6 g/d In the same electric furnace as used in Example 6, the filaments were heat-treated under heat treatment conditions indicated in Table 9 for 6.9 seconds to obtain fibers having properties shown in Table 9.

Table 9

| Heat Treatment Conditions | | Properties of Fibers | | | Initial Modulus of Elasticity (g/d) | Knot Strength (g/d) |
|---|---|---|---|---|---|---|
| Temperature (°C.) | Tension (g/d) | Fineness (denier) | Tensile Strength (g/d) | Elongation (%) | | |
| 300 | 1.2 | 3.2 | 30.2 | 4.1 | 718 | 6.9 |
| 350 | 1.2 | 3.1 | 30.9 | 3.6 | 827 | 5.9 |
| 400 | 1.2 | 3.2 | 31.7 | 3.4 | 856 | 5.9 |
| 450 | 1.2 | 3.2 | 31.8 | 3.2 | 934 | 5.9 |
| 500 | 1.2 | 3.1 | 34.2 | 3.2 | 990 | 6.0 |
| 550 | 1.2 | 3.1 | 36.0* | 3.2 | 1053 | 4.9 |

Note
*Maximum tensile strength was 39.1 g/d among 10 sample filaments.

What we claimed is:

1. A fiber composed of a high-molecular-weight copolyamide consisting essentially of units (A) represented by the following formula:

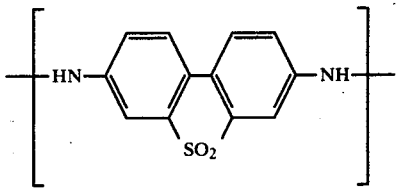
(A-1)

or

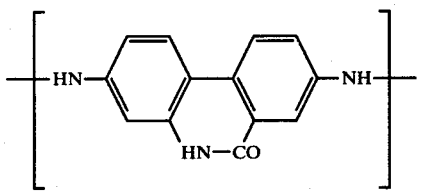
(A-2)

units (B) represented by the following formula:

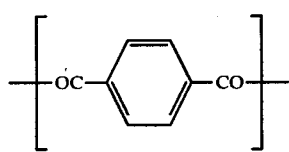
(B)

and units (C) represented by the following formula:

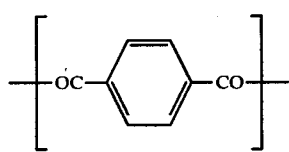
(C)

in which the units (A), (B) and (C) are present in such amounts that the sum of amounts of units (A) and (B) is substantially equimolar to the amount of the units (C) and the molar ratio of the units (A) to the units (B) is in the range of from 10/90 to 50/50, said fiber having an initial modulus of elasticity of from 400 to 1,085 g/d and a tensile strength of from 16 to 44.1 g/d.

2. The fiber as set forth in claim 1 wherein the inherent viscosity of the copolyamide least is from 2.0 dl/g to 7.56 dl/g as measured in 95 to 98% sulfuric acid at a polymer concentration of 0.5 g/dl and a temperature of 30° C.

3. The fiber as set forth in claim 2 wherein the inherent viscosity of the copolyamide least is from 3.0 dl/g to 7.56 dl/g as measured in 95 to 98% sulfuric acid at a polymer concentration of 0.5 g/dl and a temperature of 30° C.

4. The fiber according to claim 1, wherein said high-molecular-weight copolyamide consists essentially of units (A-1), (B) and (C).

5. The fiber according to claim 1, wherein said high-molecular-weight copolyamide consists essentially of units (A-2), (B) and (C).

6. A high-molecular-weight fiber-forming copolyamide consisting essentially of units (A) represented by the following formula:

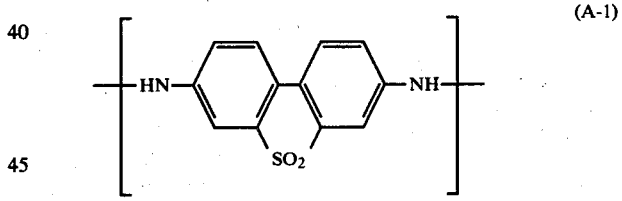
(A-1)

or

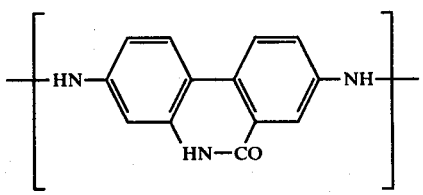
(A-2)

units (B) represented by the following formula:

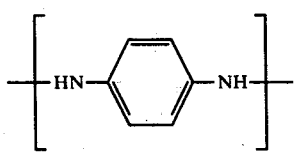
(B)

and units (C) represented by the following formula:

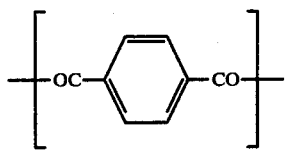 (C)

in which the units (A), (B) and (C) are present in such amounts that the sum of amounts of units (A) and (B) is substantially equimolar to the amount of the units (C) and the molar ratio of units (A) to the units (B) is in the range of from 10/90 to 50/50.

7. The high-molecular-weight fiber-forming copolyamide of claim 6 which consists essentially of units (A-1), (B) and (C).

8. The high-molecular-weight fiber-forming copolyamide of claim 6 which consists essentially of units (A-2), (B) and (C).

* * * * *